INVENTOR.
GEORGE T. COCKSEDGE

BY Rogers & Bereskin

Agent

Sept. 19, 1967 G. T. COCKSEDGE 3,342,278
CHANNEL PRESSURE CONTROL MEANS FOR AIR CUSHION SUPPORTED CRAFT
Filed Aug. 2, 1965 8 Sheets-Sheet 2

INVENTOR.
GEORGE T. COCKSEDGE
BY
Rogers & Bereskin
Agent

Sept. 19, 1967  G. T. COCKSEDGE  3,342,278
CHANNEL PRESSURE CONTROL MEANS FOR AIR CUSHION SUPPORTED CRAFT
Filed Aug. 2, 1965  8 Sheets-Sheet 3

INVENTOR.
GEORGE T. COCKSEDGE

BY Rogers & Bereskin

Agent

Sept. 19, 1967  G. T. COCKSEDGE  3,342,278
CHANNEL PRESSURE CONTROL MEANS FOR AIR CUSHION SUPPORTED CRAFT
Filed Aug. 2, 1965  8 Sheets-Sheet 6

INVENTOR.
GEORGE T. COCKSEDGE
BY
Rogers & Bereskin

Agent

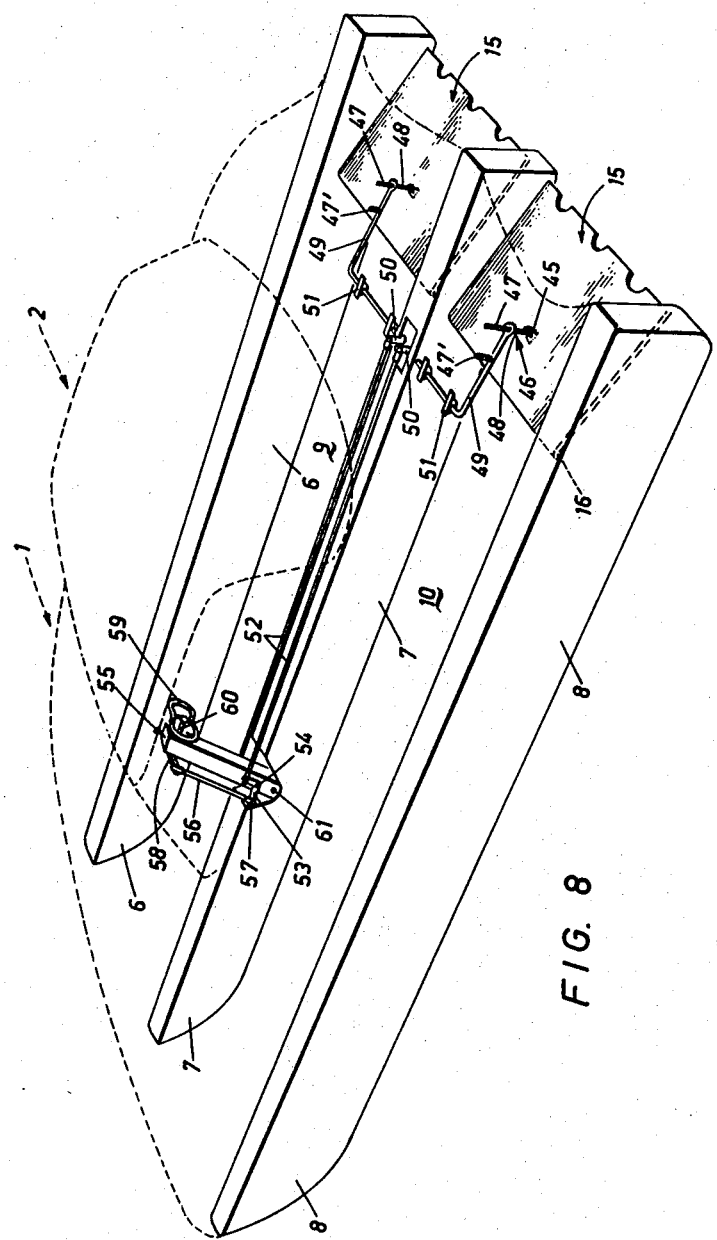

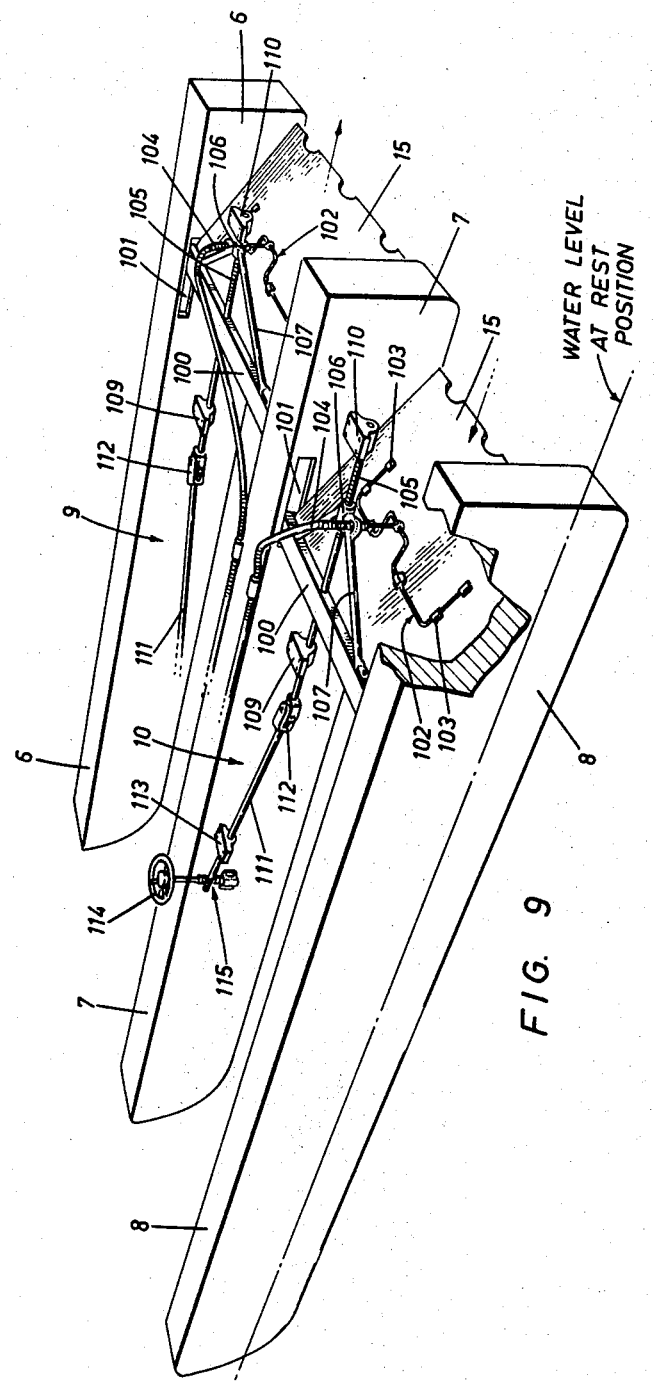

United States Patent Office 3,342,278
Patented Sept. 19, 1967

3,342,278
CHANNEL PRESSURE CONTROL MEANS FOR AIR CUSHION SUPPORTED CRAFT
George Thomas Cocksedge, R.R. 1, Niagara Falls, Ontario, Canada
Filed Aug. 2, 1965, Ser. No. 476,296
The portion of the term of the patent subsequent to Aug. 2, 1982, has been disclaimed and dedicated to the Public
10 Claims. (Cl. 180—7)

This invention relates to a craft adapted to be propelled over surfaces at varying heights above the surfaces. More particularly, this invention relates, in one embodiment, to a craft which is adapted for travel over any type of surface such as land, marsh, ice, snow and water, the craft being supported on a cushion of air and propelled forwardly by air expulsion, the craft being capable of hovering in any position and landing on and taking off from all types of surfaces.

Many craft of the aforementioned type have been devised and, in some cases, tested, with varying degrees of success. Such craft as I am aware of, however, have suffered from the following disadvantages: (a) lack of fore and aft stability, (b) inability to make banked turns and (c) inability to travel over sloping and horizontal ground at the same time and maintain control.

Fore and aft stability refers to the ability of a craft to maintain its longitudinal axis in a horizontal position. In one type of recently tested, prior art craft, the necessary stability was imparted by men who shifted their weight from one part of the craft to another as required. In the most advanced British air cushion vehicle, fore and aft stability is achieved by pumping water from one part of the craft to another as required.

Prior art types of craft of which I am aware are not able to effect banked turns, but rather execute flat turns. It will be appreciated that in the execution of flat turns there is a very large force acting outwardly on the craft and a much smaller force driving the craft forward. Moreover, in a flat turn, the under surface of the craft remains horizontal. From a consideration of the foregoing, it will be seen that if a craft loses its source of propulsion while executing a flat turn, because of the large outwardly acting force and the horizontal attitude of the craft, there is a good chance that the craft will overturn when it strikes the surface over which it is travelling. Moreover, it should be apparent that flat turns are most inefficient as a great deal of the propulsion energy of the craft must be employed to prevent outward "sliding" of the craft. Since there is invariably some sliding in a flat turn, such turns cannot be executed as quickly as banked turns, and at any given speed the safe turning radius of a craft in a flat turn is greater than that of a craft in a banked turn. It should also be noted that crafts executing flat turns are strongly susceptible to overturning if the outer side of the craft on the turn hits an object.

In contrast to the foregoing, in the execution of a banked turn there is a much smaller probability of overturning as a result of loss of propulsion because of the relatively small outwardly acting force on the craft and the relatively large force causing the craft to move forward. Because the outside edge of the craft is elevated above the inside edge, there also is less probability that it will strike an object.

It will be seen from the foregoing that there are numerous advantages in banked turns over flat turns.

Prior art types of air-cushioned craft of which I am aware are unable to remain horizontal when travelling half on level ground and half over a depression such as a ditch in the ground, the ditch running in the direction of travel of the craft. The reason for this is that a greater volume of air is required to support the part of the craft above the ditch than is required to support the craft above level ground. Since the air cushion under such craft cannot be increased at one point and decreased at another, the result is that the craft must tilt so that its under surface is approximately the same distance from the ground at all points.

Accordingly it is a primary object of my invention to provide a craft adapted to be propelled over surfaces at varying heights above the surfaces, the craft having means to provide fore and aft stability.

Another primary object of my invention is to provide a craft adapted to be propelled over surfaces at varying heights above the surfaces, the craft being capable of executing banked turns and having means to permit the craft to travel evenly in cross-winds and to travel evenly over irregular terrain.

According to one aspect, my invention consists of a craft which comprises two, longitudinally extending spaced apart hulls, means connecting these hulls, the hulls and the latter means defining a longitudinally extending channel. The channel has an open bow end, an open stern end and an open underside. Propelling means draw air into the channel, adjacent the bow of the craft, and propel the air through the channel towards the stern. Covering means such as a downwardly extending bow plate pivotally mounted in the channel for upward and downward movement cover the bow end of the channel and prevent any substantial amount of air from passing through the bow end during forward motion of the craft. Means such as a stern plate may be pivotally mounted in the channel for upward and downward movement at the rear of the channel to permit the volume of air escaping from the stern end to be varied. Steering means such as rudders permit steering of the craft. In accordance with my invention, means are provided for varying the center of lift of the craft relative to its center of gravity. These means comprise means for longitudinally varying the position of the bow plate or the stern plate, preferably the former, relative to the bow and stern of the craft.

In another embodiment of my invention which may be, and preferably is provided with means for varying the center of lift of the craft relative to the center of gravity of the craft, the craft comprises at least three longitudinally extending spaced apart hulls and means connecting these hulls, the hulls and the latter means defining two longitudinally extending, side-by-side channels, each channel having an open bow end, an open stern end and an open underside. In accordance with my invention I provide means adapted to create a pressure differential between the channels so as to permit one side of the craft to be elevated above the other. These means may comprise individually adjustable stern plates pivotally mounted on the hull for upward and downward movement, the plates being positioned across and to the rear of the channels. It is important to note that the displacement of such a craft is such that when the craft is at rest it floats in water with the hulls only partly submerged so that there is air in the channels from bow to stern thereof. In addition, the craft is preferably provided with means for varying the center of lift of the craft relative to the center of gravity of the craft.

Various other objects and advantages of craft embodying my invention will become apparent from the following description taken in conjunction with the drawings, in which:

FIGURES 5 to 9 show, in ghost outlines, the embodiment of my invention illustrated in FIGURES 1 and 2, various control systems for a craft embodying my invention being shown in solid outlines in each of the figures.

Figure 1:
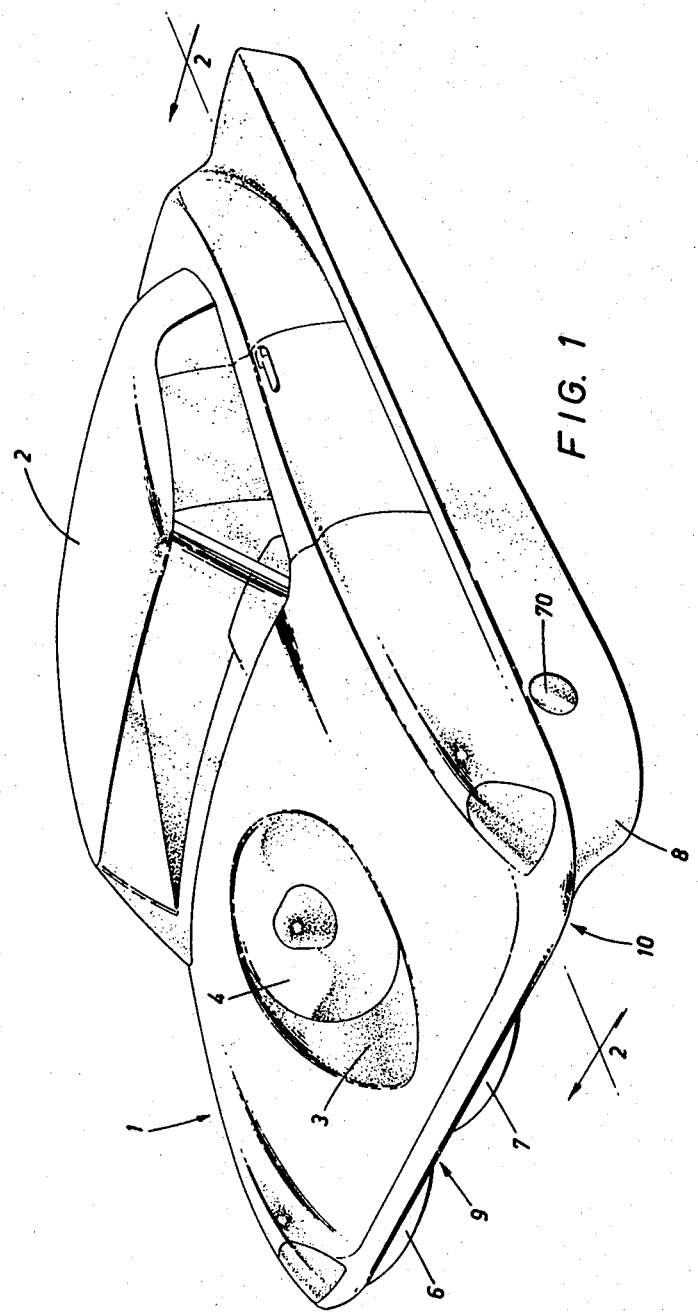
FIGURE 1 illustrates in perspective one embodiment of my invention.
Figure 2:
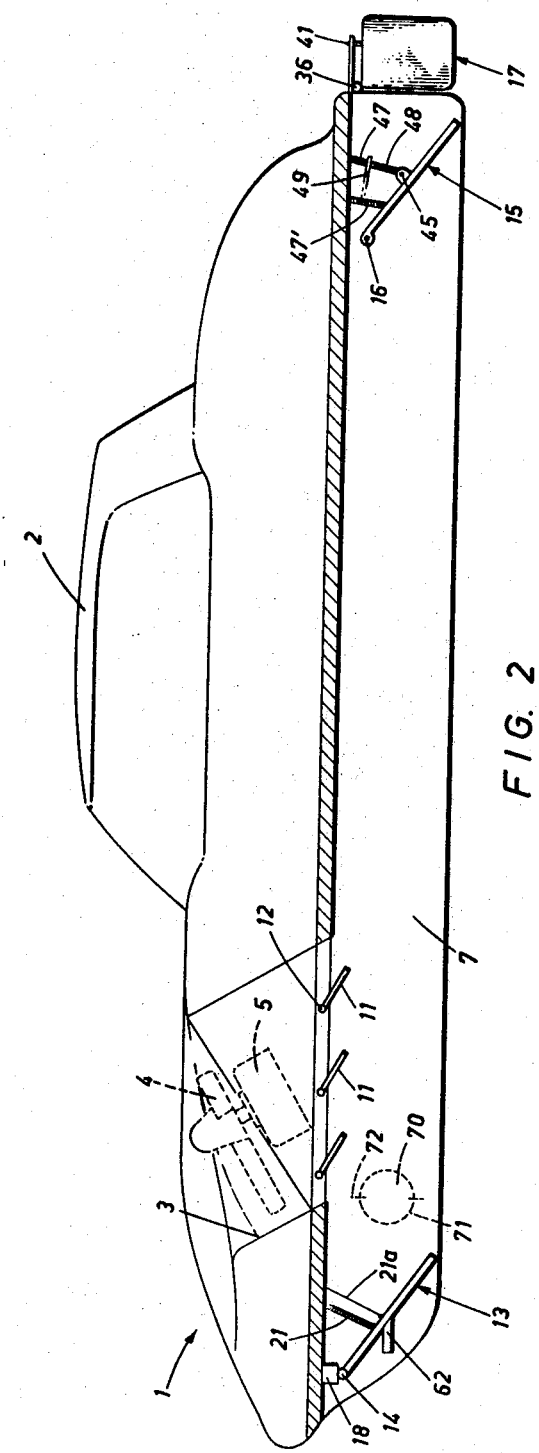
FIGURE 2 is a section taken along line 2—2 in FIGURE 1.

Referring now to FIGURES 1, 2 and 5 to 9 inclusive, but in particular to FIGURES 1 and 2, for a more detailed description of apparatus embodying my invention, I have shown a craft comprising a superstructure 1 including a cabin 2 for the accommodation of the operator of the craft and other passengers and from which the craft may be controlled. Positioned in superstructure 1 is an inclined duct 3 in which is located an inclined propeller 4 driven by a variable speed motor 5 of any suitable type, the throttle control for the motor being located in cabin 2. Downwardly extending from the deck of superstructure 1 are three hulls 6, 7 and 8 which, together with the deck, define two longitudinally extending, side-by-side channels or plenum chambers 9 and 10, each of the channels having an open bow end, an open stern end and an open underside. The deck of superstructure 1 connects the three hulls together. Duct 3 has one end open to the atmosphere, the other end of duct 3 opening into each of channels of plenum chambers 9 and 10. A plurality of parallel, gang-adjustable vanes 11 are pivotally mounted at 12 for upward and downward movement. Vanes 11 are positioned across the open end of duct 3 opening into each of channels 9 and 10 and are pivotable about axes perpendicular to the longitudinal axis of the craft.

As best shown in FIGURE 2, a bow plate 13 is provided at the bow end of each of channels 9 and 10 and extends downwardly from 14 where it is pivotally mounted for upward and downward movement.

A stern plate 15 is provided at the stern end of each of channels 9 and 10. Stern plate 15 is pivotally mounted for upward and downward movement at 16 and extends downwardly from 16.

Rudders 17 are provided in order to permit the craft to be steered.

It will be appreciated that other steering means may be employed, if desired, without departing from my invention. For example, a motor driving a propeller in a vertical plane may be mounted at the stern of hull 1. A rudder may be positioned behind the propeller, the rudder being adapted to be rotated about a vertical axis in the backwash of the propeller. Such steering apparatus is well known and, per se, forms no part of my invention.

Butterfly valves 70 are provided in ports 71 which extend through walls or compartments 6 and 8 at the bow of the craft. Butterfly valves 70 are rotatable about vertical axes 72 and facilitate steering during reverse motion of the craft as will become apparent hereinafter. Valves 70 may be opened or closed be any suitable mechanism, various mechanisms being known in the art. The position of valves 70 is controlled by the operator from cabin 2.

In one position of bow plates 13, the position shown in FIGURE 2, the bow plates abut against fixed stops 62 secured to the side surfaces of compartments 6, 7 and 8. The purpose of stops 62 will be explained fully hereinafter.

Figure 5:
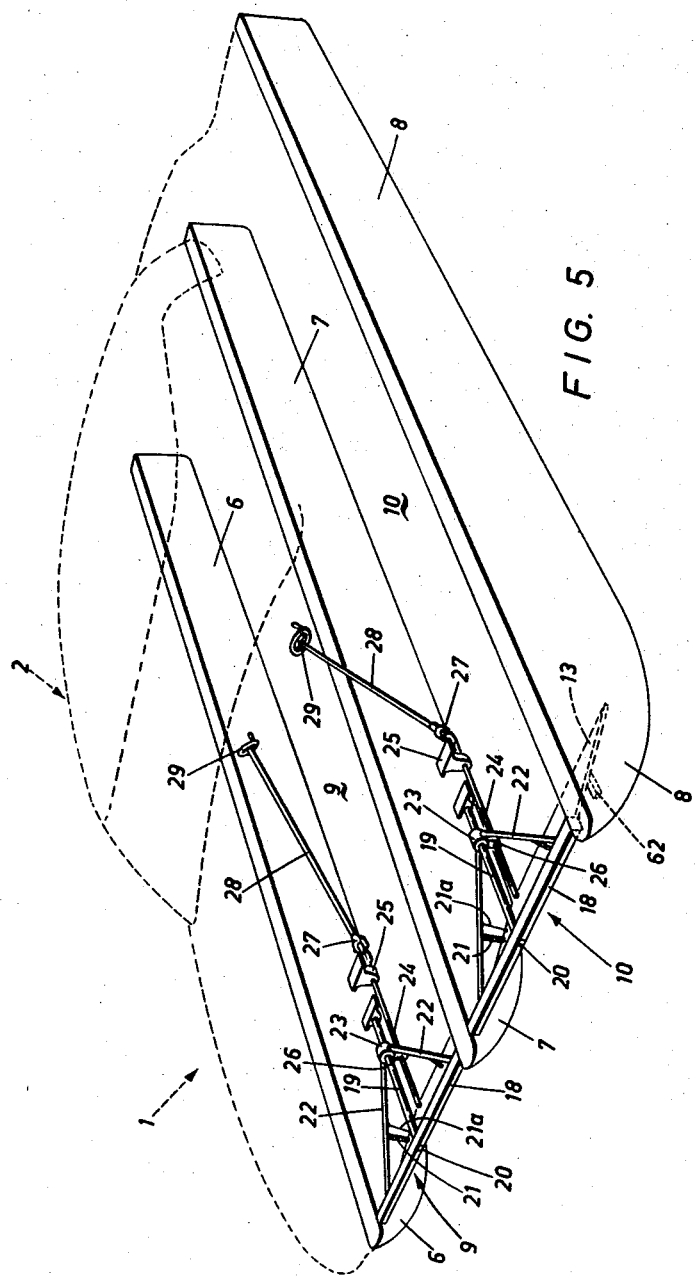

In FIGURE 5 I have shown suitable apparatus for altering the effective length of the channels by permitting bow plates 13 to be moved longitudinally relative to the bow and stern of the craft so as to permit the center of lift of the craft to be varied with respect to the center of gravity of the craft, thereby providing fore and aft stability. As shown in this figure and in FIGURE 2, each of bow plates 13 is supported from a bar or beam 18 and is pivotally mounted thereon at 14 for upward and downward movement, the pivoting action being achieved by any suitable means such as hinges. A shaft 19 is rigidly secured to superstructure 1 by any suitable means. Each bar 18 has an aperture 20 therein through which shaft 19 may pass. The ends of each bar 18 are slidably mounted on and are supported from tracks in hulls 6, 7 and 8. Each bar 18 is secured to one end of a pair of struts 22, the other end of the struts being connected to a collar 23 having an aperture therein through which shaft 19 passes. Tension springs 21 and cables 21a, the latter of which serve as stops, are connected between struts 22 and each bow plate 13. A threaded rod 24 is supported at one end by a thrust-bearing 25 secured to superstructure 1 and threadably engages a nut 26 secured to collar 23. Threaded rod 24 is adapted to be rotated in either direction through an assembly comprising a universal joint 27 connected to one end of threaded rod 24, shaft 28 connected to universal joint 27 and a handwheel 29 secured to shaft 28, handwheels 29 being located in cabin 2.

It will be apparent from a consideration of FIGURE 5 that if handwheel 29 is rotated, thereby causing rotation of threaded rod 24, bar 18 carrying bow plate 13 will move either backward or forward in a direction parallel to the longitudinal axis of the craft, the direction of movement depending on the direction of rotation of handwheel 29. As will become more apparent hereinafter, the control system just described permits the center of lift of the craft to be varied with respect to the center of gravity of the craft.

It will be appreciated that numerous other control systems of a more refined type, employing servo mechanism for example, may be utilized to move bow plates 13, and it would not depart from my invention to substitute different control systems for the one described.

In FIGURE 9 I have shown suitable apparatus for altering the effective lengths of the channels by permitting stern plates 15 to be moved longitudinally in channels 9 and 10 parallel to the longitudinal axis of the craft. Stern plates 15 are pivotally mounted on bars 100 which are supported on tracks 101 secured to hulls 6, 7 and 8. Torsion bars 102 are secured to stern plates 15 by suitable brackets 103. Flexible push-pull cables 104 are fastened to torsion bars 102. At their forward ends cables 104 are connected to bell cranks 53 (not shown) illustrated in FIGURE 8 so as to permit upward and downward movement of stern plates 15, all as described in detail in connection with FIGURE 8.

Extending through each bar 100 is a threaded shaft 105 which threadably engages an internally threaded collar 106 secured to struts 107 extending from bar 100. Each shaft 105 is rotatably mounted in bearings 109 and 110 secured to the deck of superstructure 1 and is connected to a drive shaft 111 by a universal joint 112. Drive shafts 111 rotate in bearings 113 secured to the deck of superstructure 1 and are driven by rotation of handwheels 114 through gears 115. Rotation of handwheels 114 in clockwise and counterclockwise direction causes bars 100 to move forwardly or backwardly in channels 9 and 10 thus altering the position of stern plates 15.

Figure 6:
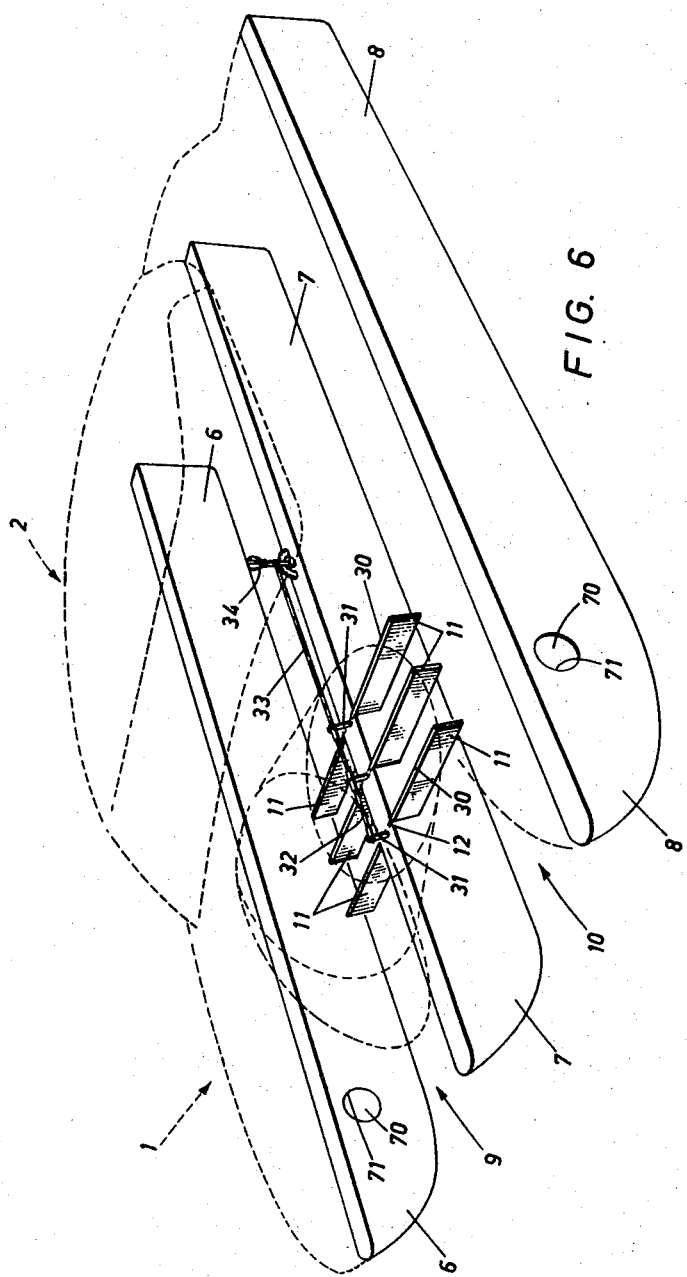

Referring now to FIGURE 6, I have shown apparatus which permits gang-control of the position of vanes 11, and which also permits individual adjustment of the position of each of vanes 11. As shown in this figure, each of vanes 11 is mounted on a rod 30 which is rotatable about an axis perpendicular to the longitudinal axis of the craft and in bearings (not shown) secured to the deck of superstructure 1. Secured to each rod 30 is an upstanding arm 31, and between each of arms 31 turnbuckles 32 are connected. A rigid control rod 33 is connected to the last of arms 31, the other end of the control rod being secured to a conventional lever 34 provided in cabin 2.

It will be apparent from a consideration of FIGURE 6 that adjustment of any one turn-buckle 32 will permit individual adjustment of the position of a vane 11. On the other hand, forward or backward movement of lever 34 will permit gang-adjustment of the positions of all of vanes 11. It will be appreciated that vanes 11 may be individually adjusted and gang-adjusted by mechanisms other than that described.

Figure 7:
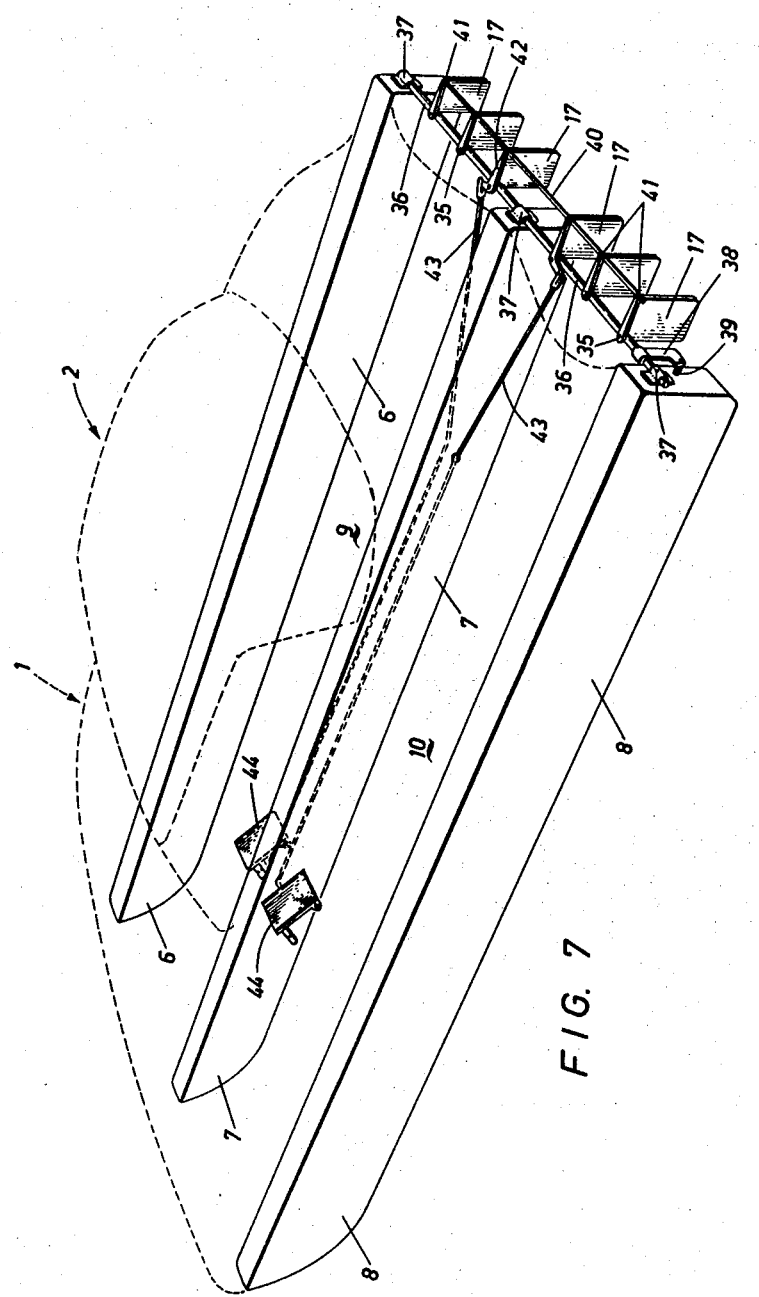

Referring now to FIGURE 7, each of rudders 17 is pivotally mounted about a vertical axis at 35 on a rod or beam 36 which extends across the beam of the craft and is pivotally mounted about a horizontal axis in bearings 37. Secured to beam 36 is a stop 38 which abuts against hull 8, and between which and hull 8 is connected a tension spring 39. A rod 40 is pivotally connected at 41 to each of rudders 17. Pivotally mounted about vertical axis on beam 36 are two bell cranks 42, one end of each of which is pivotally connected to rod 40. The other ends of bell cranks 42 are connected to cables 43 which pass through guides (not shown) and whose other ends are connected a foot-pedals 44 in cabin 2.

It will be seen from a consideration of FIGURE 7 that depression of the right-hand foot-pedal 44 will cause rudders 17 to pivot about axis 35 in one direction, whereas depression of foot-pedal 44 will cause rudders 17 to pivot about axis 35 in the other direction. In this manner the craft is able to be steered. Tension spring 39 is provided to return the rudder assembly to the position shown in the figure. Should any one of rudders 17 contact an object during forward movement of the craft, the rudders 17 and beam 36 will rotate upwardly against the action of spring 39, thereby permitting the rudders to clear the obstacle. Once the obstacle has been passed over, tension spring 39 returns beam 36 and rudders 17 to the normal position shown in the figure, stop 39 maintaining the rudder assembly in the normal position.

Those skilled in the art will realize that other control systems for rudders 17 may be employed with equal advantage.

In FIGURE 8 I have shown apparatus useful for raising and lowering stern plates 15. Pivotally mounted at 45 on each of stern plates 15 is a rod 46, around which are provided compression springs 47 and 48 whose purpose will become more apparent hereinafter. A pair of rigid, double right-angled bars 49 are provided, one for each stern plate, each of the bars having an upstanding arm 50 and being mounted for rotation in bearings 51 on the deck of superstructure 1. The opposite ends of each of bars 49 are secured to rods 46. Connected to upstanding arms 50 are cables 52 whose opposite ends are connected to ends of bell cranks 53 pivotally mounted at 54 on a column 55. The other ends of bell cranks 53 are connected to rods 56 by a pivotal connection by 57, the opposite ends of rods 56 being slidably mounted on a member 58 which is adapted to be rotated by a control wheel 59 secured to a shaft 60 connected to member 58. Column 55 is in cabin 2 and is pivotally mounted about a horizontal axis at 61.

Since the upper end of each spring 48 is secured to rod 46 by any suitable means, it will be seen that forward or backward movement of column 55 about pivot 61 will raise or lower, respectively, stern plates 15 about pivot axis 16 through the control linkage described. Rotation of wheel 59 in one direction or the other will raise one of stern plates 15 and lower the other depending on the direction of rotation of wheel 59. In this manner it is possible to cause the pressure in one of channels 9 and 10 to exceed the pressure in the other channel, so as to permit certain desirable results to be achieved, these results being explained more fully hereinafter. It will be appreciated that a control system of the type just described makes it possible to individually control each stern plate 15 independently of the other. In other words, forward or backward movement of column 55 coupled with the proper degree of rotation of wheel 59 will cause one stern plate to move while the other remains stationary.

It will be understood, of course, that many other types of control systems may be employed for raising and lowering stern plates 15 about pivot axis 16.

For the purpose of describing the operation of the craft shown in FIGURES 1, 2 and 5 to 9, it will be assumed that the craft is sitting motionless in water, with stern plates 15 in the raised position. Bow plates 13 will also be in a semi-raised position since tension springs 21 draw bow plates 13 upwardly when the craft is at rest. The craft, at rest, is designed to float in water to about half the depth of hulls 6, 7 and 8. In order to raise the craft from the water, and assuming the craft is to be driven in a forward direction, the operator lowers stern flaps 15 to the position shown in FIGURE 2 by means of the control system shown in FIGURE 8, the operation of this control system having been previously described. The position of vanes 11 are adjusted by the operator by means of lever 34 so that the vanes are in a position to deflect and distribute air passing through duct 3 evenly throughout channels 9 and 10. The operator then starts motor 5 which causes rotation of propeller 4. As a result of the rotation of propeller 4, air is drawn through duct 3 and passes into channels 9 and 10, each of which have the same volume and cross-section, the air flow to each channel being equal. The inrush of air into channels 9 and 10 results in bow plates 13 being forced downwardly against the action of springs 21 to the position shown in FIGURE 2. Since bow and stern plates 13 and 15, in the position shown in FIGURE 2, effectively seal the ends of channels 9 and 10, butterfly valves 70 are closed, and water seals the underside of the channel, it will be apparent that air pressure will build up in channels 9 and 10. Motor 5 is driven at sufficient speed to cause the air pressure in the channels to lift the craft from the water. Preferably the craft is only lifted several inches above the water because of the fact that it requires more power to raise the craft to a higher level, and in order to eliminate drag it is only neceessary that the craft clear the water surface. In this position the craft will hover over the water being supported on a cushion of air escaping from the sides, bow and stern of the craft. In order to cause forward motion of the craft, stern plates 15 are raised by pushing column 55 forward, and at the same time the speed of motor 5 is increased. This permits air to escape through the stern ends of channels 9 and 10, thus driving the craft in a forward direction. It will be apparent that the speed of motor 5 should be increased as aforementioned since power is now required to drive the craft forward as well as to support it above the water. When the craft is thus in forward motion, it may be necessary to adjust the position of vanes 11 for most efficient operation. During forward motion of the craft, bow plates 13 remain in their fully lowered position, thus preventing any substantial amount of air from escaping through the bow ends of channels 9 and 10. If the bow plates are positioned relative to the bow and stern of the craft so that they do not abut against stops 62, the fully lowered position of the bow plates is determined by the length of cables 21a which maintain the angular disposition of bow plates 13 relative to beam 18 constant in all positions of the bow plates further from the bow than that position shown in FIGURE 2. Maximum forward thrust is achieved with maximum throttle and with the stern plates fully raised.

It is most important to note that the displacement of a craft embodying my invention is such that at rest the craft floats in water with hulls 6, 7 and 8 only partly submerged and channels 9 and 10 only partly filled with water, air occupying the remainder of the channels from the bow to the stern thereof. Where herein I use the term displacement, I refer to displacement under loaded conditions, although the same holds true of unloaded displacement. This is in direct contrast to boats of the type where channels are provided on the undersides of the boats and where air is directed into these channels. In the case of such boats, the channels are completely submerged when the boats are at rest, and the air which is directed into the channels is employed only to reduce friction, not to support the boat above water, as in the case of a craft embodying my invention. This difference is important since, in accordance with my invention, only one source of power, e.g. a driven propeller, is required to start my craft moving forwardly and to provide the supporting air cushion. With boats of the aforementioned type, two power sources must be employed, one a driven propeller which reacts with the water to drive the boat forwardly, and the other the driven blower to provide the air. With a craft embodying my invention, because hulls 6, 7 and 8 are only partly submerged when the craft is at rest, air may be forced into channels 9 and 10 when the craft is at rest creating lift and thrust, so that no additional power source is required. In addition, when bow plates 13 are raised, the frontal area of a craft embodying my invention is relatively small, and the smallest possible frontal area is desirable to reduce resistance to forward motion.

It should be noted that a craft embodying my invention may best be started from water by raising the craft as aforementioned, but leaving the side walls of the craft just sealed to the water. In this way water resistance is substantially decreased, because only a very slight amount of hulls 6, 7 and 8 is in contact with the water. After the craft has obtained a forward speed of between 15 to 20 knots, it may be lifted from the water. In this way the spray caused when the craft lifts from the water is left behind.

The direction in which the craft travels is controlled by the position of rudders 17, which position may be altered by depression of foot pedals 44 as discussed. Air emerging from channels 9 and 10 strikes rudders 17 because the rudders are positioned adjacent the open ends of channels 9 and 10. If the rudders are moved to any position other than parallel to the longitudinal axis of the craft, the air emerging from channels 9 and 10 will strike the flat sides of the rudders causing the craft to turn in one direction or the other, the sharpness of the turn being dictated by the amount that the rudders are deflected from the position shown in FIGURE 7.

In order to permit the craft to travel in the reverse direction vanes 11 are adjusted by means of lever 34 so as to cause the air drawn through duct 3 by propeller 4 to be directed towards the bow rather than the stern of the craft. For reverse motion stern plates 15 are placed in their down position as shown in FIGURE 2, and bow plates 13 are moved fully forward by means of the apparatus shown in FIGURE 5. When the bow plates are moved fully forward they contact stops 62 (best shown in FIGURE 2) which cause the bow plates to be raised above the position shown in FIGURE 2, thereby permitting air to escape from the bow ends of channels 9 and 10. It will be apparent that under such conditions reverse motion of the craft will result. In order to facilitate steering during reverse motion, butterfly valves 70 are opened, thereby permitting air to escape from the sides of the bow end of the craft at an acute angle to the sides of the craft and away from the stern thereof.

Steering of the craft during reverse motion may be achieved by opening butterfly valve 70 on one side of the craft a different amount than the butterfly valve on the other side of the craft, thus causing an unbalance on the forces acting on the sides of the craft and pushing it in a reverse direction. Rudders 17 may also be employed for steerage during reverse motion because some air does escape through the stern ends of channels 9 and 10 even when stern plates 15 are in their lowered position.

A very important facet of a craft embodying my invention resides in the means employed to impart fore and aft stability to the craft. In accordance with my invention fore and aft stability is imparted to the craft by altering the effective length of the channels permitting either the bow or stern plates 13 and 15 respectively to be moved longitudinally with respect to the bow and stern of the craft. While in FIGURE 5 I have shown an embodiment of my invention in which the bow plates are so movable, it will be appreciated that fore and aft stability may be attained equally as well by permitting longitudinal movement of stern plates 15 as shown in FIGURE 9 and previously described. The result of moving bow plates 13 or stern plates 15 in channels 9 and 10 is to alter the effective length of the channels, thereby varying the position of the center of lift of the craft with respect to the center of gravity of the craft. When the bow or stern plates are moved towards the stern, the center of lift of the craft also shifts towards the stern, thereby tending to make the craft nose heavy. Alternatively, when the bow or stern plates are moved towards the bow of the craft, the center of lift of the craft also is shifted towards the bow making the craft stern heavy. It will thus be appreciated that in accordance with my invention the center of lift of a craft embodying my invention may be altered so as to provide the most advantageous disposition of the craft under any particular loading conditions. For example, it will be seen that with a craft embodying my invention it will be advantageous to place the fuel tanks towards the front of the craft, and as the fuel tanks empty, shift the bow plates towards the stern of the craft. In this manner the maximum lift area available is utilized during the beginning of the journey, and the proper disposition of the craft is achieved for the whole of the journey.

Shifting either the bow plates or the stern plates, as hereinbefore described, provides a means for enabling a wide variation in the position of the center of lift of the craft relative to the center of gravity thereof and also avoids the placement of baffles in channels 9 and 10 which form undesirable flow obstructions. In contrast, the provision of a fixed inflatable member in a channel (as used in a prior boat), does not permit a wide variation in the position of the center of lift of the craft relative to its center of gravity and forms a flow obstruction when uninflated.

Another very important advantage of a craft embodying my invention is that it is capable of banked turns, operates well in cross-winds and can travel over sloping and horizontal ground at the same time. These results are achieved as a result of the provision of a pair of channels 9 and 10 and means for increasing or decreasing the pressure in one of the channels above or below the pressure in the other channel. For example, and referring to FIGURE 8, assume it is desired to make a turn to the left with the craft. This may be achieved by lowering the right-hand stern plate 15 by rotation of wheel 59. When this stern plate is lowered the pressure in chamber 9 rises above the pressure in chamber 10. This, of course, elevates the right-hand side of the craft relative to the left-hand side of the craft. The left-hand rudder pedal 44 shown in FIGURE 7 then may be depressed causing the craft to execute a banked turn. The execution of banked turns as opposed to flat turns, and the advantages of the former over the latter have been discussed previously and need not be enumerated further at this point.

Assuming that the craft is travelling in a forward direction in a cross-wind which would normally tend to cause the craft to be blown sideways off of this desired straight-ahead path, it is possible with a craft embodying my invention to overcome this undesirable effect of a cross-wind. This may be achieved simply by lowering the stern plate 15 on the down-wind side of the craft, thereby increasing the pressure in the channel or plenum chamber on the down-wind side of the craft. As previously explained this will, of course, raise the down-wind side of the craft, permitting more air to escape from the down-wind side of the craft than the up-wind side of the craft, thereby cancelling the effect of the cross-wind.

If a craft embodying my invention is travelling over a surface contoured such that one of the channels, say channel 9 for example, is over horizontal ground, whereas channel 10 is over a ditch of lower elevation, the horizontal attitude of the craft may be maintained by increasing the air pressure in channel 10 by lowering the stern plate 15 at the rear of channel 10.

As shown in FIGURE 5, tension springs 21 are connected between bow plates 13 and struts 22. During forward motion of the craft considerable air pressure is applied to the inner surfaces of bow plates 13 and cables 21a are taut. Springs 21 exert an upward force on bow plates 13 which cancels a substantial amount of the downward force on the bow plates due to air pressure. Thus, if either bow plate strikes an object on the ground or water, it will be able to pivot upwardly relatively easily about pivot axis 14. When the object has been passed over, the bow plates will be forced back to their normal position by the air pressure acting on their inner surfaces and against springs 21.

In order to permit stern plates 15 to absorb impact shocks, compression springs 47 and 48 (FIGURE 8) or torsion bars 102 (FIGURE 9) are used. When one of the stern plates strikes an object, the plate is forced upwardly against springs 47 and 48 which compress and then return the plate to its original position after the object has been passed over. Springs 47' connected between the undersurface of hull 1 and rods 49 assist in neutralizing the force of the air pressure directed upwardly on stern plates 15 in the same manner as do springs 21 for the bow plates.

Figure 3:
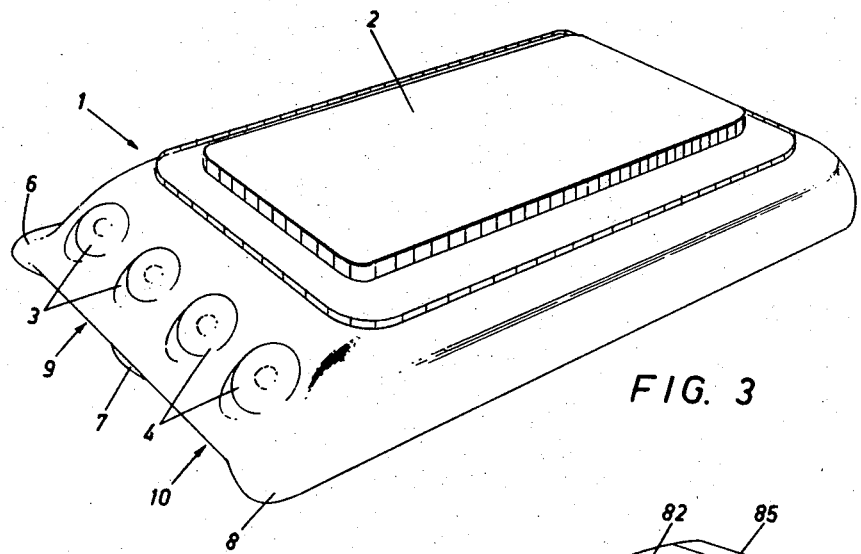
FIGURE 3 illustrates, in perspective, another embodiment of my invention.

The embodiment of my invention illustrated in FIGURE 3 operates in the same manner as the embodiment previously described except that the craft shown in FIGURE 3 is much larger than the craft shown in FIGURE 1 and is intended for transoceanic crossings. Basically the craft shown in FIGURE 3 is identical to the craft just described, the only difference being that in the craft shown in FIGURE 3 two propellers 4 are provided for each channel rather than a single propeller driving air into both channels as shown in FIGURE 1.

It should be noted that with an embodiment of my inveniton such as shown in FIGURE 3 different means may be employed for individually varying the air pressure in each of channels 9 and 10. Whereas I have disclosed that this may be achieved by greater movement of one stern plate 15 than the other stern plate, or by opposite movements of the stern plates, in an embodiment such as is illustrated in FIGURE 3, where at least one propeller supplies each channel, it may also be achieved by raising the speed of the propeller or propellers supplying one channel above the speed of the propeller or propellers supplying the other channel. This may be achieved, for example, by raising the speed of the motor or motors driving the propeller or propellers supplying one channel and, at the same time lowering the speed of the motor or motors driving the propeller or propellers supplying the other channel. Individual variation in the air pressure in each channel also may be achieved by employing a single motor and driving the propellers in the channel from opposite ends of a standard differential. In order to raise pressure in one channel and lower it in the other, it is only necessary to apply a brake to one side or the other of the differential. The braked side of the differential drives its propeller at a low speed, whereas, the unbraked side of the differential drives its propeller at a higher speed than before the brakes were applied. Since such a control system is relatively slow acting, it is preferable to employ it only when the pressure differential in the channels is to be maintained for a substantial length of time. Movement of the stern plates should be used where fast response is desired, i.e. to clear obstacles etc. It may be desirable to have both control systems provided on the craft.

Figure 4:
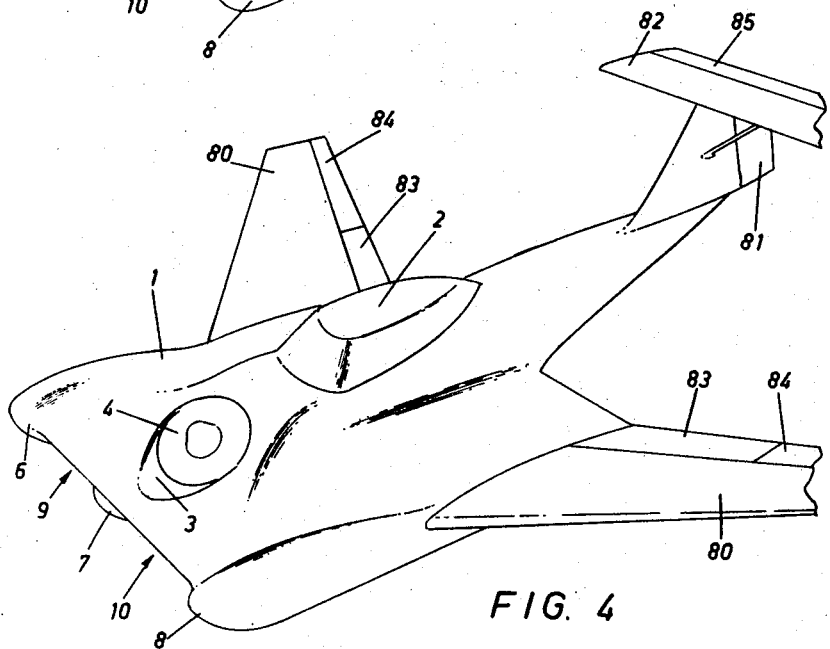
FIGURE 4 depicts in perspective a further embodiment of my invention.

The embodiment of my invention shown in FIGURE 4 is adapted to fly at great heights above the earth, the craft utilizing the principle of my invention for take-off and landing only. The craft has a fuselage 1 with a cockpit 2 therein. Positioned in the fuselage is a propeller 4 in a duct 3. The underside of fuselage is the same as the underside of the craft shown in FIGURES 1, 2 and 5 to 9. The craft is provided with wings 80 and a tail assembly comprising a rudder 81 and stabilizer 82. Wing flaps 83 which serve as air brakes and ailerons 84 are provided on the wings and an elevator 85 is provided on stabilizer 82.

As stated previously, the craft utilizes the principles of my invention already explained only during take-off and landing, and when in free flight both the bow plates 13 and the stern plates 15 are raised permitting the craft to be driven in a forward direction through the air by means of propeller 4. The bow plates raise automatically during high speed flight. The air drawn through duct 3 is, of course, deflected rearwardly by any suitable means such as vanes 11. In flight the craft is conventionally controlled by movements of the ailerons, flaps, rudder and elevator. The stern plates may be linked with flaps 83 and move up and down therewith to provide the desired amount of braking.

A craft similar to that shown in FIGURES 1 and 2 has been constructed and successfully operated. The hulls and superstructure of the craft are built of wood framing covered with plywood and Masonite. The craft is 14 feet long and has a beam of 8 feet. The unloaded weight of the craft is 800 pounds. The craft is capable of forward speeds of 20 m.p.h. at an operating altitude of 1½ inches when powered with a 25 horse-power air-cooled engine. It was found that approximately 20 horse-power is required to maintain the craft at an altitude of 1½ inches. Thus only about 5 horse-power is available for forward propulsion. It will be appreciated that with larger engines crafts embodying my invention are capable of very high speeds.

While preferred embodiments of my invention have been disclosed in detail, it will be appreciated that modifications and changes may be made therein without departing from the spirit and scope of my invention as defined in the appended claims.

What I claim is:

1. A craft having a bow and stern and adapted to be propelled over surfaces at varying heights above said surfaces, said craft comprising three longitudinally extending spaced apart hulls, means connecting said hulls together, said hulls and said means connecting said hulls together defining two longitudinally extending, side-by-side channels, each of said channels having an open underside, propelling means for drawing air into said channels adjacent said bow of said craft and for propelling air through said channels towards said stern of said craft, bow plate means positioned across said channels adjacent said bow of said craft, pivotally supported stern plates respectively positioned across each of said channels adjacent said stern of said craft, said stern plates being movable to open and close said channels adjacent said stern of said craft, and a stern plate control member for actuating said stern plates and pivoted about an axis for movement in the fore and aft direction of the craft and including means rotatable about an axis transverse to said first axis, first means connecting said stern plates with said control member whereby movement of said control member in said direction moves said stern plates in unison, and second means connecting said last named means to said rotatable means whereby rotation of said rotatable means moves said stern plates differentially to thereby permit air pressure in the respective channels to be varied, the displacement of said craft being such that at rest said craft floats in water with said hulls only partly submerged and said channels only partly filled with water, air occupying the remainder of said channels from the bow to the stern thereof.

2. A craft according to claim 1 wherein said bow plate means are pivotally mounted in said channels remote from said open underside thereof.

3. A craft according to claim 1 wherein said propelling means comprises a propeller, said propeller being positioned in a duct having an end open to the atmosphere, said duct opening into each of said channels.

4. A craft according to claim 3 including a plurality of gang-adjustable vanes positioned across the open end of said duct communicating with said channels, said vanes being pivotally mounted about axes substantially perpendicular to the longitudinal axis of said craft.

5. A craft according to claim 4 including means for individually adjusting the angular position of each of said vanes.

6. A craft according to claim 1 wherein said propelling means comprises at least first and second propelling means, said first and second propelling means each supplying air to a different one of said channels.

7. A craft according to claim 1 including means for steering said craft comprising rudder means positioned at said stern of said craft in the path of air ejected from the stern ends of said channels.

8. A craft according to claim 7 wherein said rudder means comprises a plurality of gang-adjustable rudders pivotally crank-mounted about vertical axes on a beam extending across said craft, said means for operating said rudder means being adapted to impart lateral movement to said beam.

9. A craft according to claim 8 wherein said beam is pivotally mounted about its longitudinal axis, and including means resiliently biasing said beam to an operating position.

10. A craft according to claim 1 including means for raising said bow plate means to permit expulsion of air through the bow ends of said channels during reverse motion of said craft.

References Cited

UNITED STATES PATENTS

| | | |
|---|---|---|
| 1,621,625 | 3/1927 | Casey. |
| 2,322,790 | 6/1943 | Cristadoro. |
| 2,387,627 | 10/1945 | Warner. |
| 2,483,663 | 10/1949 | Nowak. |
| 2,993,462 | 7/1961 | Gough. |
| 3,027,860 | 4/1962 | Priest _____ 180—7 X |
| 3,066,753 | 12/1962 | Hurley et al. _____ 180—7 |
| 3,106,260 | 10/1963 | Bollum _____ 180—7 |
| 3,198,274 | 8/1965 | Cocksedge _____ 180—7 |

A. HARRY LEVY, *Primary Examiner.*